Jan. 11, 1955   W. S. TANDLER   2,699,068
PRESSURE MEASURING AND RECORDING APPARATUS
Filed Feb. 25, 1950   5 Sheets-Sheet 3

Fig. 5

INVENTOR.
WILLIAM S. TANDLER
BY Campbell, Brumbaugh
Free and Graves
HIS ATTORNEYS.

Fig. 6

United States Patent Office

2,699,068
Patented Jan. 11, 1955

2,699,068

PRESSURE MEASURING AND RECORDING APPARATUS

William S. Tandler, New York, N. Y., assignor, by mesne assignments, to The Warner & Swasey Research Corporation, Cleveland, Ohio, a corporation of Ohio Application February 25, 1950, Serial No. 146,185

12 Claims. (Cl. 73—391)

The present invention relates to pressure responsive devices and more particularly to a new and improved device for measuring and recording variations in fluid pressures.

A number of different types of pressure gauges have been designed which utilize the distortion or deflection of a metal tube or diaphragm under the influence of a fluid as a measure of the fluid pressure. In one type, a corrugated diaphragm is acted upon by the fluid pressure and its deflection is transmitted through a link and toothed quadrant to a pinion which turns a pointer with respect to a dial. Another form is the Bourdon type gauge, in which the fluid is supplied to one end of a tube of elliptical cross-section which is bent into circular form. The other end of the tube is sealed and is coupled by a link to a pivoted quadrant having teeth meshing with a pinion on the pointer shaft.

While the mechanical deflection of the tube or diaphragm in a well designed gauge of either type is accurately representative of pressure variations, it has been found that errors are introduced by the mechanical linkages employed for communicating the deflection of the tube or diaphragm to the indicator. These linkages produce friction, loading and backlash effects, for example, which may cause errors in the indicator readings.

The principal object of the invention, therefore, is to provide new and improved pressure gauging apparatus of the above character which is free from the above noted deficiencies of the prior art.

Another object of the invention is to provide new and improved pressure gauging apparatus in which a record is made of variations in the deflection of a member that is displaced by the pressure of a fluid.

A further object of the invention is to provide new and improved pressure responsive mechanism of the above character for initiating operation of indicating or control mechanism when a predetermined pressure or pressures are reached.

Still another object of the invention is to provide new and improved pressure gauging apparatus of the above character which is capable of accurately measuring the pressure in any given system without substantially altering existing conditions in the system.

A still further object of the invention is to provide new and improved pressure gauging apparatus of the above character which responds accurately to very small displacements of the deflecting member, whereby a desired pressure range can be accommodated with a minimum change in volume of the system.

These and other objects of the invention are attained by permitting the deflecting member to move freely in space in accordance with fluid pressure variations in a system, and accurately measuring displacements of the deflecting member by probe means connected in an electrical circuit. By disposing one or more probe means in the path of the deflecting member at accurately determined fixed distances therefrom corresponding to selected fluid pressures, any desired control or indicating apparatus may be actuated upon engagement of the probe means with the deflecting member.

According to another embodiment of the invention, the displacements of the deflecting member are accurately measured by producing relative approaching movement between it and the probe means, while a corresponding synchronous relative movement is produced between a recording device and a cooperating record strip. Immediately upon engagement of the deflecting member with the probe means, the recording device is actuated and makes a record on the record strip. Preferably, an electronic circuit is interposed for greater accuracy in determining the instant of contact between the probe means and the deflecting member. The distance of the record on the record strip from a reference datum is an accurate measure of the distance of the deflecting member from a corresponding reference datum, and is, therefore, an accurate measure of the displacement of the deflecting member under the influence of the fluid pressure to which it is subjected.

Additional objects and advantages of the invention will be apparent from the following detailed description of several representative embodiments taken in conjunction with the accompanying drawings in which.

While any suitable pressure responsive device whose output is a mechanical deflection that is a function of pressure may be utilized in apparatus designed according to the invention, a conventional type Bourdon tube will be shown in the illustrative embodiments disclosed herein by way of example.

Figures 1, 2:
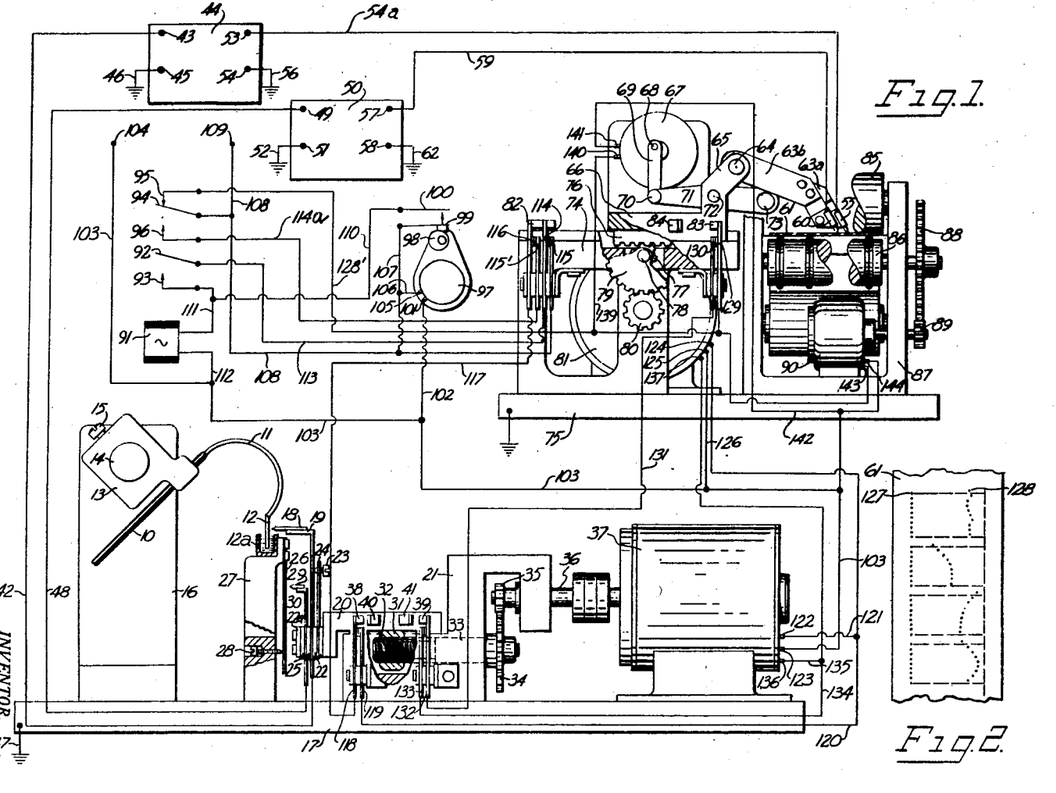
Fig. 1 is a schematic diagram of pressure recording apparatus constructed according to the invention.
Fig. 2 illustrates a typical record which the apparatus shown in Fig. 1 is adapted to produce.

The typical pressure recording apparatus shown in Fig. 1 comprises a conventional Bourdon tube 10 connected at one end to a system containing a fluid whose pressure is to be recorded (not shown) and provided with a flattened portion 11 (Figs. 1 and 4) at its other end bent in the form of a circle and terminating in a downwardly extending straight portion 12 which is sealed off at the bottom. Preferably, suitable dampening means such as a trough of oil 12', for example, should be provided for dampening movement of the straight portion 12 of the tube. The Bourdon tube 10 may be rigidly supported in any desired manner as, for example, on a bracket 13 secured on a rod 14 by a conventional set screw 15. The rod 14 may be mounted on a vertical member 16 secured on a base plate 17, as shown.

It will be understood that as the pressure in the tube 11 increases, it tends to straighten out so that the straight portion 12 moves towards the right. Conversely, when the pressure decreases, the radius of the circular portion 11 tends to decrease, thus moving the straight portion 12 to the left. Further, it is well known that the deflections of the straight portion 12 are proportional to the pressure in the tube 10 to a relatively high degree of accuracy.

The deflections of the straight tube portion 12 are adapted to be measured by probe means 18, preferably mounted on an arm 19 secured to a carriage 20 slidably mounted for reciprocating movement in a suitable frame 21 secured on the base plate 17. The probe means 18 is preferably resilient, although it need not be since the straight tube portion 12 is resilient. The probe means 18 and the resilient member 19 are preferably made of conducting material and they are insulated from the carriage 20 and other parts by suitable insulating material 25.

It may be desirable to provide for some adjustment of the position of the probe means 18 and any suitable means may be provided for this purpose such as, for example, a set screw 23 threadedly mounted in an arm 24 spaced away from the member 19 by a metal spacer 22 and secured to the carriage 20 and insulated therefrom by suitable insulating material 25.

It is also desirable, according to the invention, to provide means for establishing a reference datum with respect to which the deflections of the straight portion 12 of the Bourdon tube 10 may be compared. This may be accomplished, for example, by mounting a grounded contact arm 26 on a supporting member 27 secured to the base plate 17. The position of the contact member 26 may be adjusted in any suitable manner, as for example, by means of a set screw 28 threadedly mounted in the supporting member 27.

The contact member 26 is adapted to be engaged by second probe means 29 mounted on a resilient member 30 secured on the carriage 20 and insulated both from the arms 19 and 24 and the carriage 20, as shown. The probe assembly is secured to the carriage 20 by a metal plate 22a.

With the construction described above, the position of the contact member 26 is adjusted so that when it is engaged by the probe means 29 during the advancement of the carriage 20, the probe means 18 will at that time be at the position where it should engage the straight portion 12 of the Bourdon tube 10 at a selected reference pressure. If the straight portion 12 of the tube 10 is not at that position at that instant, the probe means 18 will engage it either before or after the probe means 29 engages the contact arm 26, and the distance moved by the carriage 20 in going from the two positions at which engagement of the probe means 29 and 18 with the contact arm 26 and the straight portion 12 of the bourdon tube 10, respectively, occurs, is taken as a measure of the deflection of the straight portion 12.

The carriage 20 may be reciprocated in any desired manner as, for example, by means of a nut 31 thereon which is threadedly mounted on a lead screw 32 formed on a shaft 33 carrying a gear 34 engaging a pinion 35 mounted on the shaft 36 of a conventional reversible synchronous motor 37.

Reversal of rotation of the motor 37 is adapted to be accomplished by a control circuit including front and rear reversing switches 38 and 39, respectively, mounted on the frame 21, which are adapted to be operated by front and rear switch actuators 40 and 41, respectively, mounted on the carriage 20. A typical control circuit for effecting this operation will be described in greater detail hereinafter.

The probe means 18 is electrically connected by the conducting arm 19 and by a conductor 42 to the input terminal 43 of a conventional amplifier 44, the other input terminal 45 of which is grounded at 46, the circuit being completed through the Bourdon tube 10 and the frame 17 which is also grounded at 47. In similar fashion, the probe means 29 is connected by its conducting arm 30 and by a conductor 48 to the input terminal 49 of a second conventional amplifier 50, the other input terminal 51 of which is connected to ground at the point 52, the circuit being completed through the contact arm 26 and the frame 17.

The amplifier 44 is so designed that when the probe means 18 engages the straight portion 12 of the Bourdon tube 10, a circuit is completed to the amplifier input terminals 43 and 45 and an electric signal is immediately produced at the amplifier output terminals 53 and 54. This signal is transmitted from the terminal 53 through the conductor 54a to a recording stylus 55 which is adapted to engage the surface of a record strip 61 made of suitable material such as Teledeltos paper, for example, which is grounded, the amplifier terminal 54 also being grounded at 56.

Similarly, the engagement of the second probe means 29 with its contact member 26 completes a circuit to the input terminals 49 and 51 of the amplifier 50, immediately causing an electric signal to appear at the output terminals 57 and 58 thereof. This signal is transmitted from the terminal 57 through the conductor 59 to a second recording stylus 60 which is also adapted to engage the record strip 61, the amplifier terminal 58 being grounded at 62 so as to complete the circuit.

The recording styli 55 and 60 are preferably mounted adjacent one another on the arms 63a and 63b, respectively, which are pivotally mounted at 64 on an arm 65 formed on a carriage 66. The carriage 66 supports a conventional rotary electromagnet 67 having a crankshaft 68 thereon which is adapted to reciprocate a connecting rod 69 pivotally secured to one end 70 of a rocker arm 71. The rocker arm 71 is pivotally mounted on the arm 65 at a point 72 intermediate the ends thereof and it is provided with an actuator 73 at its other end which serves alternately to raise and lower the arms 63a and 63b carrying the styli 55 and 60 as the rocker arm 71 is oscillated by the electromagnet 67.

The carriage 66 is slidably mounted for reciprocating movement on a suitable support 74 secured on a base plate 75. Reciprocation of the carriage 66 may be effected in any desired manner as, for example, by means of a suitable rack 76 formed thereon engaging a pinion 77 on a shaft 78 carrying a gear 79. The gear 79 engages a pinion 80 driven by a conventional reversible synchronous motor 81 mounted on the base plate 75.

Reversal of the direction of rotation of the motor 81 is accomplished by a suitable control circuit to be described in greater detail hereinafter including front and rear reversing switches 82 and 83, respectively, mounted on the frame 74, which are adapted to be engaged by an actuator 84 mounted on the carriage 66.

The record strip 61 is adapted to be maintained stationary while the recording styli 55 and 60 are being moved transversely thereof in recording the measurements, as will be described below. After each record has been completed, and while the recording styli 55 and 60 are being returned to the starting position by the motor 81, the record strip 61 is advanced longitudinally to present an adjacent portion thereof to receive another record. This may be effected by any suitable mechanism such as, for example, the cooperating rollers 85 and 86 mounted in a suitable frame 87 formed on the base plate 75. The roller 86 may be provided with a gear 88 engaging a pinion 89 adapted to be driven by a conventional electromagnetic ratchet or stepper 90 operated by a control circuit to be described in greater detail hereinafter.

The typical electrical control system shown in Fig. 1 comprises a relay 91 having a movable contact 92 which is normally disengaged from a cooperating fixed contact 93, and a second movable contact 94 which is normally engaged with a cooperating fixed contact 95. Upon energization of the relay 91, however, the movable contact 94 is adapted to disengage the contact 95 and to engage a cooperating fixed contact 96.

The relay 91 is adapted to be energized periodically by mechanism including a conventional synchronous timing motor 97 which is adapted to drive continuously an eccentric cam 98. The cam 98 causes a movable switch contact 99 to engage a fixed switch contact 100 at successive intervals of time, say, every three seconds, for example. One terminal 101 of the motor 97 may be connected by the conductors 102 and 103 to one supply mains terminals 104, the other motor terminal 105 being connected by the conductors 106, 107 and 108 to the other supply mains terminal 109.

The movable switch contact 99 is also connected by the conductor 107 to the supply mains terminal 109 while the fixed switch contact 100 is connected by the conductors 110 and 111 to one terminal of the relay 91, the other terminal of which is connected by the conductors 112 and 103 to the supply mains terminal 104. It will be apparent, therefore, that each time the switch contacts 99 and 100 are engaged the relay 91 is energized.

Assuming that the several component parts of the apparatus are in the position shown in Fig. 1, energization of the relay 91 disengages the engaged switch contacts 94 and 95 and engages the switch contacts 94 and 96. Simultaneously, the switch contacts 92 and 93 are engaged, thereby connecting the conductor 111 to a circuit including a conductor 113, the movable switch contact 114 engaging fixed switch contact 115 of the front reversing switch 82, and the conductor 108 to the supply mains terminal 109. This maintains the relay 91 energized until the reversing switch contacts 114 and 115 are opened, after the switch contacts 99 and 100 are subsequently opened by the continuous rotation of the motor 97.

The engagement of the relay contacts 94 and 96 completes a circuit which is traced from the supply mains terminal 109 through the conductor 108, engaged relay contacts 94 and 96, the conductor 114a, fixed switch contact 115' engaging movable contact 116 of front reversing switch 82, the conductor 117, the movable contact 118 engaging fixed contact 119 of the front reversing switch 38, the conductors 120 and 121, the forward rotation terminal 122 of the motor 37, the common motor terminal 123 and the conductor 103 to the second supply mains terminal 104. This energizes the synchronous motor 37 and causes it to rotate in the proper direction to advance the carriage 20 towards the Bourdon tube 10.

The opening of the contacts 94 and 95 de-energizes the electromagnets 67 and 90 permitting the styli 55 and 60 to drop to the record strip 61 and the stepper 90 to reset.

The conductor 120 is also connected to the forward rotation terminal 124 of the motor 81, the common terminal 125 of which is connected by a conductor 126 to the conductor 103. Hence, the motor 81 is also energized and it rotates in the direction to cause the carriage 66 to advance towards the left in synchronism with the carriage 20, carrying with it the recording styli 55 and 60 which are at this time in engagement with the record strip 61, as shown in Fig. 1.

When the probe means 29 engages the contact arm 26, an electric signal appears instantaneously at the output terminals 57 and 58 of the amplifier 50, causing current to pass through the recording stylus 60 and making a record 127 (Fig. 2) on the Teledeltos record strip 61 (Fig. 2). The carriages 20 and 66 continue to advance in synchronism until the probe means 18 engages the portion 12 of the Bourdon tube 10. At that instant, an electric signal is produced at the output terminals 53 and 54 of the amplifier 44 which causes current to flow through the recording stylus 55, thus recording a second mark 128 (Fig. 2) on the Teledeltos record strip 61.

The carriages 66 and 20 continue advancing until the actuator 84 engages the forward reversing switch 82 and/or the actuator 40 engages the forward reversing switch 38. At that time, the contacts 114, 115, 115′ and 116 of the switch 82 are disengaged, as are the contacts 118 and 119 of the switch 38. Disengagement of the contacts 115′ and 116 of the switch 82 and of the contacts 118 and 119 of the switch 38 de-energizes the motors 37 and 81 so that the carriages 20 and 66, respectively, are immediately brought to rest.

Simultaneously, disengagement of the contacts 114 and 115 of the switch 82 de-energizes the relay 91 disengaging its contacts 92, 93 and 94, 96 and engaging its contacts 94, 95.

The engagement of the relay contacts 94 and 95 completes a circuit which is traced from the supply mains terminal 109 through the conductor 108, the engaged relay contacts 94 and 95, the conductor 128′, the engaged contacts 129 and 130 of rear reversing switch 83, the conductor 131, the engaged contacts 132 and 133 of the rear reversing switch 39, the conductors 134 and 135, the reverse rotation terminal 136 of the motor 137, the motor common terminal 123 and the conductor 103 to the other supply mains terminal 104. This energizes the motor 37 and causes it to rotate in the direction to return the carriage 20 to its initial position.

The conductor 134 is also connected to the reverse terminal 137 of the motor 81 so that the latter also begins to rotate in the direction to return the carriage 66 to its initial position.

At the same time, a circuit is completed from the conductor 128′ through the conductor 139, the terminals 140 and 141 of the electromagnet 67 and the conductor 142 to the conductor 103, so that voltage from the supply mains is impressed upon the electromagnet 67. As the latter rotates counterclockwise, it lowers the pivot point 70 of the rocker arm 71 and raises the actuator 73, thus lifting the arms 63a and 63b and the recording styli 55 and 60 away from the surface of the record strip 61. Further, since the conductor 128′ is also connected to the terminal 143 of the electromagnetic ratchet or stepper 90, the other terminal 144 of which is connected to the conductor 142, the stepper 90 is also energized and it moves the record strip 61 one step to present a new portion thereof on which another record may be made.

Return movement of the carriages 20 and 66 and energization of the electromagnet 67 and the stepper 90 continue until the actuator 84 engages the rear reversing switch 83 and the actuator 41 engages the rear reversing switch 39. When this occurs, the contacts 129 and 130 of the rear reversing switch 83 and the contacts 132 and 133 of the rear reversing switch 39 are disengaged, thus breaking the circuits to the motors 37 and 81 which immediately come to rest.

The record strip advancing electromagnetic stepper 90 and the styli raising and lowering electromagnet 67 remain energized until the eccentric cam 98 has been rotated to the position to engage the contacts 99 and 100, thereby energizing the relay 91 and initiating another recording operation. In this fashion, successive records may be taken at equal intervals of time of the deflection of the straight portion 12 of the Bourdon tube 10.

It will be understood that by measuring the distances between each pair of records 127 and 128 the deviation of the straight portion 12 of the Bourdon tube 10 from a reference datum may be readily ascertained. This difference is directly proportional to the deviation of the pressure being measured by the Bourdon tube 10 from a reference pressure.

Figures 3, 4:
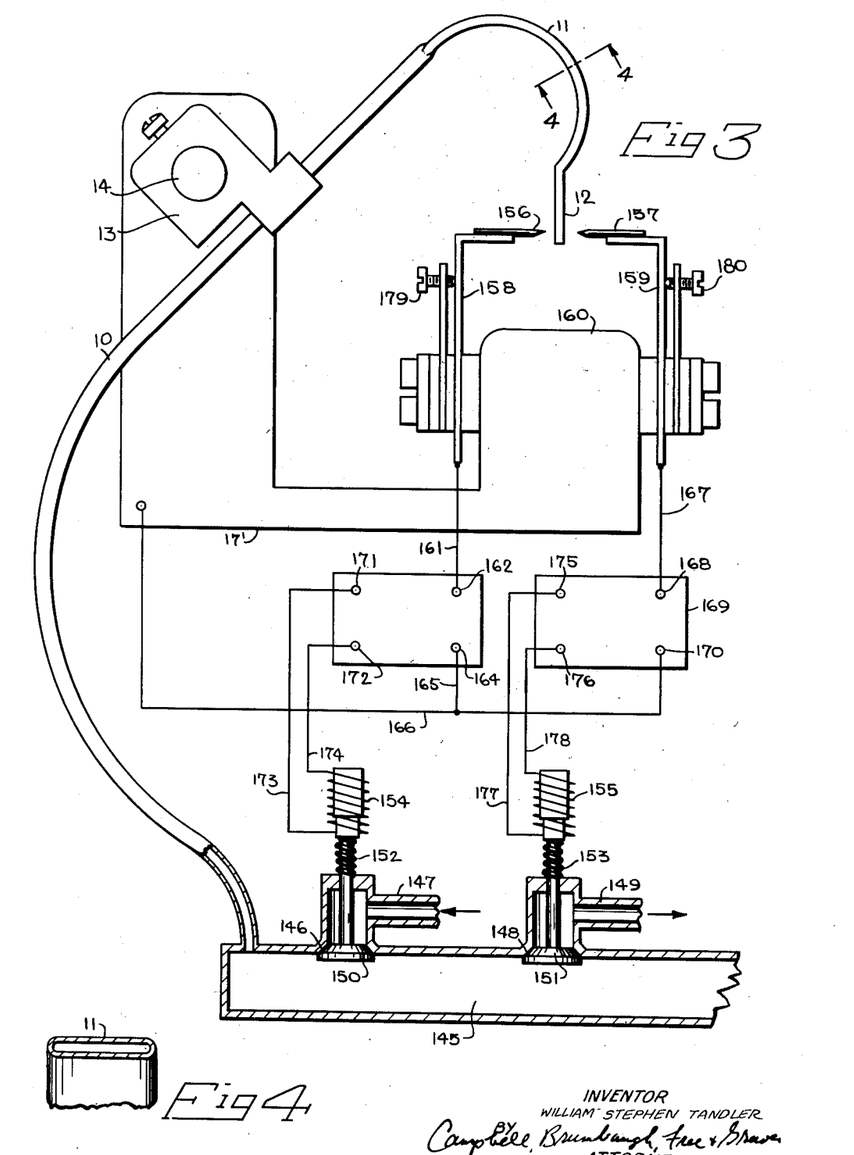
Fig. 3 illustrates a modification in which desired controls are effected at selected fluid pressures.
Fig. 4 is a view in section taken along line 4—4 of Fig. 3, looking in the direction of the arrows.

Fig. 3 illustrates another embodiment in which the deflections of the straight portion 12 of the Bourdon tube 10 are utilized to control the pressure in a vessel 145. The vessel 145 is provided with an inlet port 146 communicating with a fluid inlet line 147 and an outlet port 148 communicating with an outlet line 149. Normally, the ports 146 and 148 are closed by suitable valves 150 and 151, respectively. The valves 150 and 151 are maintained tightly seated by means of compression springs 152 and 153, respectively, and they are adapted to be unseated by conventional solenoids 154 and 155, respectively.

In this embodiment, a pair of opposed contact probe means 156 and 157 are mounted fixed spaced distances on opposite sides of the straight tube portion 12, at positions corresponding to predetermined fluid pressures in the vessel 145. The probe means 156 and 157 are mounted on arms 158 and 159, respectively, which are secured on an upright member 160 formed on the base plate 17′. The probe means 156 and its support 158 are preferably made of conducting material and the latter is insulated from the upright 160. The conducting arm 158 is connected by a conductor 161 to one input terminal 162 of a conventional amplifier 163, the other input terminal 164 of which is connected by the conductors 165 and 166 to the frame 17′, the circuit being completed through the frame 17′ and the Bourdon tube 10.

The probe means 157 and its support 159 are also preferably made of conducting material and the latter is connected by a conductor 167 to the input terminal 168 of a second conventional amplifier 169, the other input terminal 170 of which is connected to the conductor 166. The output terminals 171 and 172 of the amplifier 163 are connected by the conductors 173 and 174, respectively, to the solenoid 154. In similar fashion, the output terminals 175 and 176 of the amplifier 169 are connected by the conductors 177 and 178, respectively, to the solenoid 155.

In operation of the embodiment shown in Fig. 3, the probe means 156 and 157 are adjusted by means of the adjusting screws 179 and 180 so that they will be engaged by the straight tube portion 12 only at the extremes of a predetermined pressure range for the fluid in the vessel 145. When the fluid pressure is at the upper limit of the range, the straight tube portion 12 engages the probe means 157, causing the amplifier 169 to provide an electrical output for energizing the solenoid 155. This unseats the valve 151, releasing some of the fluid from the vessel 145 and thus reducing the fluid pressure therein.

On the other hand, when the fluid pressure in the vessel 145 is at the lower extreme of the range, the straight tube portion 12 engages the probe means 156, thereby causing the amplifier 163 to energize the solenoid 154. This unseats the valve 150, permitting additional fluid to be supplied from the inlet 147 and thus raising the pressure, whereupon the straight tube portion 12 moves out of engagement with the probe means 156.

From the foregoing, it will be understood that the invention provides simple yet highly effective apparatus for measuring and recording fluid pressures, or for effecting desired pressure responsive controls. Since the deflecting portion of the pressure responsive member is allowed to move freely in space, it can be made much smaller in size than has been possible heretofore. Moreover, by including the measuring probe means and the deflecting portion of the pressure responsive member in the recording circuit, the record is made at the instant of engagement of the two so that highly accurate measurements may be obtained.

Figure 5:
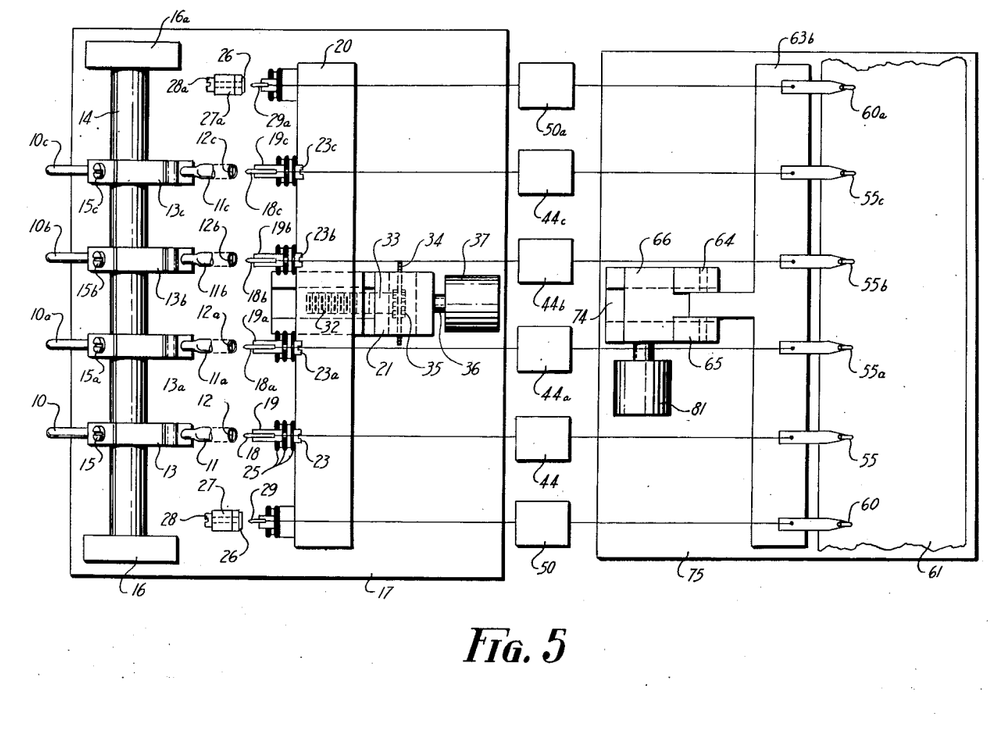
Fig. 5 illustrates a modified form of apparatus in which two styli are used to established a reference datum.

It will be understood that the apparatus described above may be adapted to record a plurality of pressure measurements without departing from the invention. This might be accomplished, for example, as shown in Fig. 5, by disposing in a row a plurality of pressure responsive devices 12, 12a, 12b and 12c for measuring the desired pressures, and mounting a row of probe means 18, 18a, 18b and 18c on the carriage 20 for engagement with the deflecting portions of the respective pressure responsive devices. A plurality of styli 55, 55a, 55b and 55c might be mounted on the arm 63b, spaced apart along the record strip, for example, each stylus being electrically connected to receive the output of a separate amplifier, 44, 44a, 44b and 44c, respectively, responsive to the electrical condition of a corresponding probe means. The records would be made essentially as described above, but the stepper 90 and the gearing 88 and 89 (Fig. 1) would be adjusted to advance the record strip 61 a distance at least equal to the distance occupied by the group of styli on the arm 63b.

Figure 6:
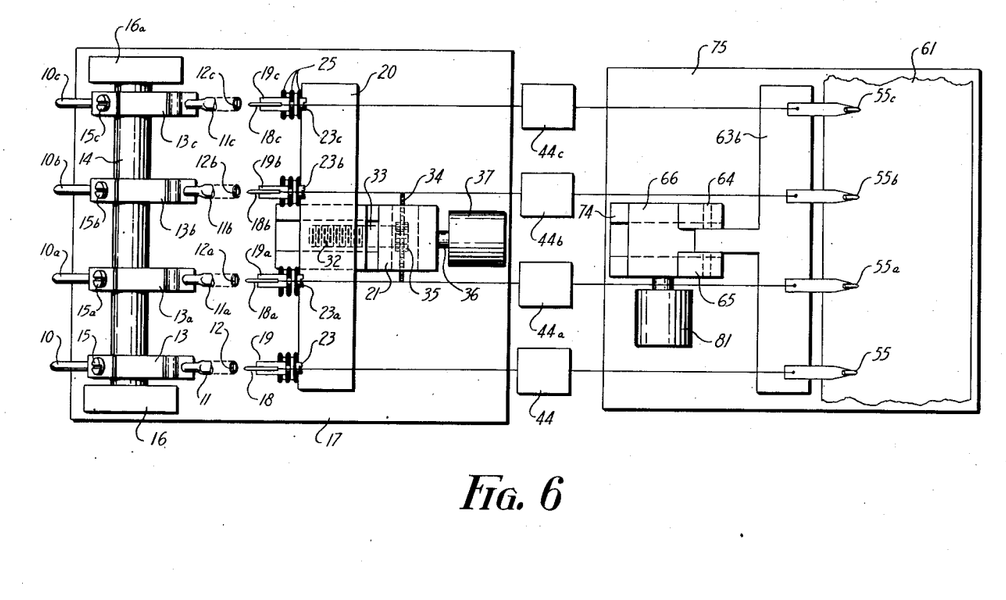
Fig. 6 is a schematic diagram of a further modification illustrating another way in which two styli may be employed to establish a reference datum.
Figure 7:
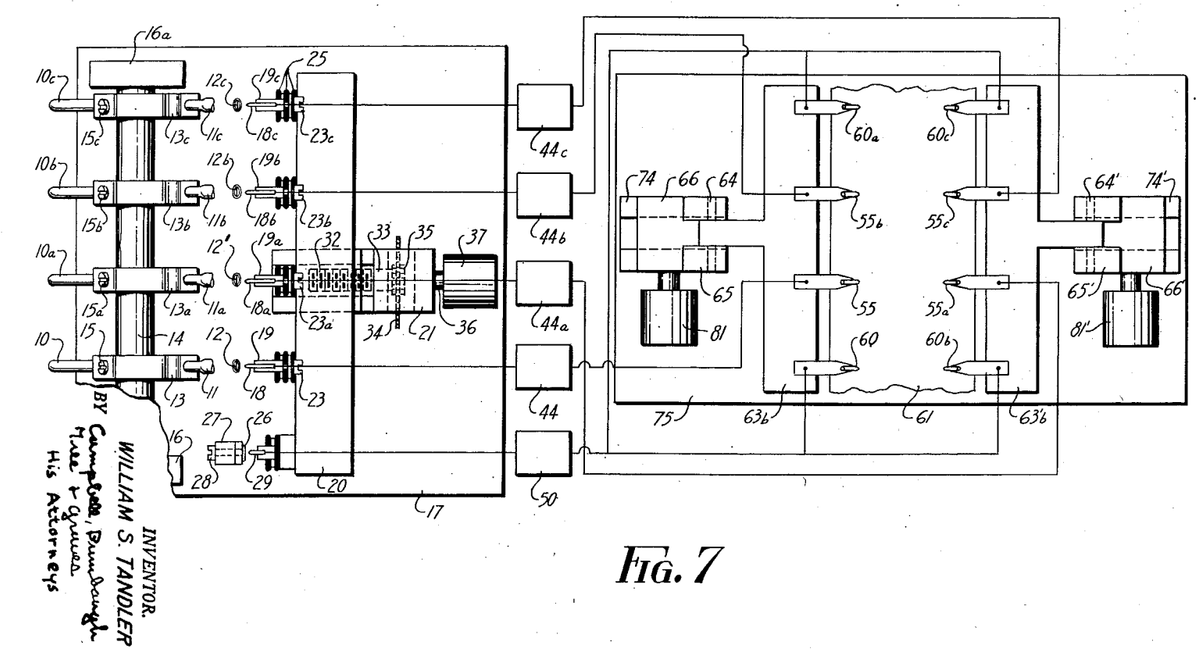
Fig. 7 illustrates schematically an embodiment for determining the differential pressures between the members of one or more pairs of pressure responsive devices, according to the invention.

In recording a plurality of measurements, as outlined above, at least two second probe means 29 and 29a and corresponding contact means 26 and 26a may be provided for the group of probe means 18, 18a, 18b and 18c, the probe means 29, 29a and the contact means 26, 26a for clarity being shown in Fig. 5 as laterally offset from the corresponding probe means 18, 18c and the pressure responsive devices 12, 12c, although in practice they may be disposed beneath the same as disclosed in Fig. 1. These two second probe means may be connected to corresponding amplifiers 50 and 50a, respectively, providing outputs for corresponding styli 60 and 60a, respectively, for recording two points on the record strip 61 determining a datum line thereon. The styli 60 and 60a may be mounted on the arm 63b as shown in Fig. 6. Alternatively, as shown in Fig. 7, only one probe means 29 and corresponding contact means 26 may be provided, with a single amplifier therefor supplying an output to at least two different styli 60 and 60a, for recording two points determining a reference datum line. As shown in Fig. 6, which is otherwise like Fig. 5, another reference line might be determined by utilizing the output from the amplifier for a single probe means 18 of a group to energize at least two different styli 55 and 55c, to record at least two reference points on the record strip 61.

In certain applications involving the recording of a plurality of measurements as described above, it may be desirable to move the styli 55 and 55b corresponding to part of a group of probe means 18, 18b, respectively, in one direction with respect to the record strip, and the styli 55a and 55c corresponding to another part 18a and 18c of the group in a different direction. This might be necessary, for example, where it is desired to determine the differential pressures between the pressure responsive devices of one group and the pressure responsive devices of another group.

Referring to Fig 7, which discloses an arrangement for determining the differential pressure between corresponding members of two groups of separate deflected pressure responsive devices, the pressure deflected devices 12, 12a, 12b and 12c are adapted to be directly engaged in the manner described in Fig. 1 by the probes 18, 18a, 18b and 18c, respectively, mounted on the carriage 20, which probes are connected to the inputs of the conventional amplifiers 44, 44a, 44b and 44c, respectively. The outputs of the amplifiers 44 and 44b are connected to the styli 55 and 55b mounted upon the arm 63b which, in the manner disclosed for Fig. 1, may be given a movement in one direction with respect to the record strip 61 in synchronism with the movement of the pressure device engaging probes by the reciprocation of the carriage 66 by means of the motor 81 (Fig. 1).

The outputs of amplifiers 44a and 44c are connected, respectively, to the styli 55a and 55c, mounted upon an arm 63'b to be aligned with the probes 55 and 55b, respectively. The arm 63'b may be given a movement in the opposite direction with respect to the record strip 61 and in synchronism with the pressure device engaging probes by means of the carriage 66' supporting arm 63'b which carriage 66' is given a reciprocating motion by the motor 81'. The arm 63'b, its pivot 64', the mounting arm 65' for the pivot 64', the carriage 66' and the motor 81' are substantially duplicates of the corresponding elements 63b, 64, 65, 66 and 81 as disclosed in Fig. 1.

In Fig. 7, as in Fig. 1, a contact arm 26 is mounted in fixed relation to the undeflected sections of the pressure deflected devices shown and is adapted to be contacted by the probe 29 which is mounted on the carriage 20. For clarity in Fig. 7, the contact 26 and probe 29 are shown as laterally offset from the pressure responsive device 12 and the probe 18, although in practice, the contact 26 and the probe 29 may be mounted beneath the device 12 and the probe 18, respectively, as shown in Fig. 1. The probe 29 (Fig. 7) is connected to the input of a conventional amplifier 50, the output of which is connected to the two styli 60 and 60a upon the arm 63b, and also to the two styli 60b and 60c mounted on the arm 63'b and aligned with styli 60 and 60a, respectively.

In operation, as the probes move to contact their respective engaging elements, the carriages 66 and 66' will move the separate groups of styli on corresponding arms 63b and 63'b in opposite directions in synchronism with the movement of the probes and in opposite directions. As disclosed with respect to Fig. 1, the contact of any of the probes 18, 18a, 18b or 18c with its corresponding pressure responsive device will produce at that instant a mark upon the record strip 61. Similarly, the engagement of the probe 29 with the contact 26 will cause all of the styli 60, 60a, 60b and 60c to produce a mark on the record strip. The styli 60, 60a, 60b and 60c will thereby establish a reference datum for each of the groups of probes on the arms 63b and 63'b, respectively.

It will be seen that by the arrangement disclosed, the record produced by the device 12 on the record strip 61 will be positioned opposite the record produced by the device 12a, and similarly the record of the device 12b will be opposite the record of the device 12c so that corresponding readings of the paired devices 12, 12a and the paired devices 12b, 12c may be easily compared in order to determine the differential pressure existing between the members of each pair. It will also be understood that with an arrangement similar to that shown additional pairs of pressure responsive devices may be utilized and their differential pressures determined.

Instead of recording dots as illustrated in Fig. 2, it is possible to use a recorder which draws a line whose length is proportional to the pressure variation. Operation of the recorder in such case would be initiated by the pulse produced upon engagement of the probe means 29 with the contact arm 26, and would be terminated upon engagement of the probe means 18 with the deflecting portion 12 of the Bourdon tube. Records of this type might be made for a single pressure measurement or for a plurality of simultaneous pressure measurements.

It is also possible to use a mechanical counter in place of the recording device shown, the counter being started or stopped by a clutch or by a starting and stopping motor actuated by the pulses produced during the measuring operation. An electronic counter might also be used. In either case, the counter might be read or recorded by photography or by other suitable means.

The apparatus disclosed herein may conveniently be regarded as a displacement comparator, since the distance between any reference point 127 and the corresponding point 128 is a measure of the displacement of the probe means 18 from a point of reference to the point where it engages the deflecting portion of the pressure responsive device.

It will be understood that the several embodiments described above are susceptible of numerous changes in form and detail within the spirit of the invention. Thus, in Fig. 1, the Bourdon tube could be moved while the probe means is maintained stationary. Other modifications will be readily apparent to those skilled in the art. The specific embodiments disclosed, therefore, are not to be regarded as limiting in any way the scope of the following claims.

I claim:

1. In fluid pressure responsive apparatus, the combination of a mechanically unloaded member having a fixed support and a portion adapted to be freely deflected as a function of the pressure of a fluid, first probe means, second probe means mounted in fixed relation to said first probe means and movable therewith relatively to said member portion, means for producing relative approaching movement between said member portion and said first and second probe means to cause said member portion and said first probe means to become engaged, contact means mounted in fixed relation to said member fixed support and adapted to engage said second probe means at a predetermined point in said relative movement, recording means, a recording medium, means synchronized with said relative approaching movement to produce a commensurate relative movement between said recording means and said medium, first electrical circuit means responsive to engagement of said contact means and said second probe means for actuating said recording means to record on said medium to establish a reference point thereon, and second electrical circuit means responsive to engagement of said member portion and said first probe means for actuating said recording means to record on said medium to establish another point thereon, the distance between said two points furnishing a measure of the deflection of said member portion.

2. In fluid pressure responsive apparatus, the combination of a mechanically unloaded member having a fixed support and a portion adapted to be freely deflected as a function of the pressure of a fluid, first probe means, second probe means mounted in fixed relation to said first probe means and movable therewith relatively to said member portion, means for producing relative approaching movement between said member portion and said first and second probe means to cause said member portion and said first probe means to become engaged, contact means mounted in fixed relation to said member fixed support and adapted to engage said second probe means at a predetermined point in said relative movement, and means synchronized with said relative movement and responsive to the respective engagements of said first and second probe means for providing an indication of the extent of said relative movement from the time of engagement of said contact means and said second probe means to the time of engagement of said member portion and said first probe means.

3. In pressure recording apparatus, the combination of a member having a portion adapted to be deflected as a function of the pressure of a fluid, probe means mounted so as to be advanced into engagement with said member portion and to be withdrawn therefrom, a record strip, recording means adapted to be moved relatively to said record strip in synchronism with the advancement and withdrawal of said probe means, and electrical circuit means responsive to engagement of said probe means and said member portion for causing said recording means to record on said record strip at the instant of engagement of said probe means and said member portion.

4. In pressure recording apparatus, the combination of a member having a portion adapted to be deflected as a function of the pressure of a fluid, first and second probe means mounted in fixed relation to each other, means for advancing said first and second probe means to bring said first probe means into engagement with said member portion and for withdrawing said first and second probe means, contact means mounted in fixed relation to said member and adapted to be engaged by said second probe means at a predetermined position during the advancement thereof, a record strip, a pair of recording styli mounted in fixed relation to one another, means for moving said styli relatively to the record strip in synchronism with the advancement of said first and second probe means, first electrical circuit means including said contact means and said second probe means for causing one of said styli to record on said record strip at the instant of engagement of said contact means and said second probe means, and second electrical circuit means including said member portion and said first probe means for causing the other of said styli to record on said record strip at the instant of engagement of said member portion and said first probe means.

5. In pressure recording apparatus, the combination of a stationary Bourdon tube having one end adapted to be connected to a source of fluid under pressure and having a deflecting portion responsive to the pressure of the fluid, probe means mounted for reciprocating movement into and out of engagement with said deflecting tube portion, a record strip, recording stylus means mounted for reciprocating movement with respect to said record strip in synchronism with the movement of said probe means, electrical circuit means including said tube deflecting portion and said probe means for causing said recording stylus means to record on said record strip at the instant of engagement of said tube deflecting portion and said probe means, means for periodically advancing said probe means and said recording stylus means in synchronism, means rendered operative after said recording stylus means has recorded on said record strip for retracting said probe means and recording stylus means in synchronism, means for raising said recording stylus means from the record strip during the retraction of said probe means and said recording stylus means, and for lowering said recording stylus means when it arrives at its initial position with respect to the record strip.

6. In combination, a plurality of probe means mounted for simultaneous movement in a given direction to be brought into respective engagements with object portions to be gauged, means for so moving said plurality of probe means, a record strip, a plurality of recording styli adapted when actuated to record upon said record strip, said styli being mounted for simultaneous movement in a given direction with respect to said record strip and in synchronism with said probe means, means for so moving said styli, a plurality of electrical means respectively responsive to the engagements of said probe means for inducing actuations of corresponding recording styli, respectively, and electrical means responsive to the engagement of at least one probe means for inducing actuation of at least one other stylus in addition to the stylus corresponding thereto.

7. In combination, a plurality of probe means mounted for simultaneous movement in a given direction to be brought into respective engagements with object portions to be gauged, means for so moving said plurality of probe means, a record strip, a plurality of recording styli adapted when actuated to record upon said record strip, said styli being mounted for simultaneous movement in a given direction with respect to said record strip and in synchronism with said probe means, the number of styli being at least one more than the number of probe means, means for so moving said styli, electrical means responsive to the engagement of at least one probe means for inducing actuations of said one more stylus and of another stylus, and a plurality of electrical means responsive to the engagements of the remaining probe means for inducing actuations of the remaining styli, respectively.

8. In combination, a plurality of probe means mounted for simultaneous movement in a given direction to be brought into respective engagements with object portions to be gauged, a record strip, a first plurality of recording styli adapted when actuated to record upon said record strip, a second plurality of recording styli adapted when actuated to record upon said record strip, first means for moving said first plurality of styli simultaneously in a given direction with respect to said record strip and in synchronism with the movement of said probe means, second means for moving said second plurality of styli simultaneously in a different direction with respect to said record strip and in synchronism with the movement of said probe means, electrical means respectively responsive to the engagements of certain of said probe means for inducing respective actuations of the styli in the first plurality thereof and electrical means respectively responsive to the engagements of certain of said probe means for inducing respective actuations of the styli in the second plurality thereof.

9. In combination, a plurality of probe means mounted for simultaneous movement in a given direction to be brought into respective engagements with object portions to be gauged, means for so moving said plurality of probe means, a record strip, a first group of recording styli adapted when actuated to record upon said record strip, said styli being mounted for simultaneous movement in one direction with respect to said record strip and in synchronism with said probe means, a second group of recording styli adapted when actuated to record upon said record strip, said styli being mounted for simultaneous movement in a different direction with respect to said record strip and in synchronism with said probe means, the total number of styli in said two groups being at least one more than the number of probe means, means for imparting the stated movements to said first and second groups of styli, electrical means responsive to the engagement of one of said probe means for inducing actuations of said one more stylus and of another stylus, electrical means responsive to the engagements of certain of the remaining probe means for inducing actuations of the remaining styli in said first group, and electrical means responsive to the engagements of certain of the remaining probe means for inducing actuations of the remaining styli in said second group.

10. In pressure responsive apparatus, the combination of at least two members each having a portion deflected as a function of pressure, at least two probe means mounted for movement to bring them into engagement with said member deflecting portions, respectively, a record strip, first recording stylus means adapted when actuated to record on said record strip, said stylus being mounted for movement in one direction with respect to said record strip and in synchronism with at least one of said probe means, second recording stylus means adapted when actuated to record on said record strip, said stylus being mounted for movement in the opposite direction with respect to said record strip and in synchronism with the other of said probe means, and electrical means respectively responsive to the engagements of said two probe means with said member deflecting portions for inducing actuations of said first and second recording stylus means, respectively, whereby indications of pressure differential may be obtained.

11. In pressure responsive apparatus, the combination of a plurality of members each having a deflecting portion responsive to fluid pressure, a plurality of probe means mounted for simultaneous movement to bring them into engagement with said member deflecting portions, a record strip, a first group of recording styli adapted when actuated to record upon said record strip and mounted for simultaneous movement in one direction with respect to said record strip and in synchronism with said probe means, a second group of recording styli adapted when actuated to record upon said record strip and mounted for simultaneous movement in the opposite direction with respect to said record strip and in synchronism with said probe means, electrical means responsive to the engagements of certain of said probe means for inducing actuations of the styli of said first group, respectively, and electrical means responsive to the engagements of certain of said probe means for inducing actuations of the styli of said second group, respectively, whereby indications of pressure differentials may be obtained.

12. In pressure recording apparatus, the combination of a member having a portion adapted to be deflected as a function of the pressure of a fluid, probe means mounted so as to be advanced into engagement with said member portion and to be withdrawn therefrom, synchronous indicating means synchronized with the probe means advancement for representing said advancement by a progressive change in condition of said synchronous means, and electric circuit means responsive to engagement of said probe means and said member portion for actuating said synchronous means at the instant of engagement of said probe means with said member portion to cause said synchronous means to indicate the instantaneous condition thereof which represents the position of said probe means at the instant of engagement.

References Cited in the file of this patent

UNITED STATES PATENTS

| | | |
|---|---|---|
| 951,658 | Phillips | Mar. 8, 1910 |
| 1,015,225 | Bacon et al. | Jan. 16, 1912 |
| 1,338,715 | Welch | May 4, 1920 |
| 1,834,517 | Dashner | Dec. 1, 1931 |
| 2,243,398 | Sewell | May 27, 1941 |
| 2,283,296 | Temple | May 19, 1942 |
| 2,356,970 | Brockett | Aug. 27, 1944 |
| 2,404,868 | Siversten | July 30, 1946 |